Patented Apr. 2, 1940

2,195,669

UNITED STATES PATENT OFFICE 2,195,669

LUBRICANT COMPOSITION

George S. Cavanaugh, Los Angeles, Calif., assignor to The Pennzoil Company, a corporation of California No Drawing. Application May 28, 1938, Serial No. 210,766

5 Claims. (Cl. 87—9)

This invention relates generally to lubricants and more particularly to lubricant compositions comprising a lubricating substance containing an element or compound designed to make the composition more effective for certain particular uses.

Although many improvements have been made in the provision of lubrication means for the various parts of machinery and industrial equipment generally, there still remain many parts and portions of machinery which have no facilities for continuous or frequent periodic automatic lubrication. The contact surfaces, or bearing surfaces of such parts are frequently subjected to what may be termed an extreme or excessive wiping action. This wiping action tends to quickly remove ordinary lubricants from the contact areas with the result that the parts are not properly lubricated unless lubricant is frequently applied, and this is impossible in the majority of cases.

As specific examples of parts of machinery where it is impossible to supply a bath of lubricant, either continuously or at frequent intervals, may be listed the valve motion parts of locomotives; the side rods and wedges of locomotives; the center plate of railroad units; brakes embodying a metal shoe or metal lining operating against a metal drum; and exposed gearing as used on various types of machines. In all such cases, and in numerous other cases not mentioned, there is an excessive wiping action on the contact surfaces which tends to quickly remove ordinary lubricants, thereby rendering them ineffective a short time after they are applied.

Parts of certain types of machinery embodying relatively movable contact surfaces which must be lubricated are often exposed to gases or liquids which tend to eat away or wash away the ordinary lubricants generally employed. The exposed gearing of large laundry machines wherein the gearing is intermittently subjected to floating by soapy liquids is an example.

The chief requirement of a lubricant for the above noted conditions is that of great tenacity to the bearing surface. To my knowledge no ordinary lubricants and none of the lubricant compositions thus far developed have this desired quality.

It therefore is a primary object of this invention to provide a lubricant composition with a very high degree of tenacity which is suitable for use in lubricating contact surfaces subjected to extreme or excessive wiping action or subjected to other lubricant removing agencies.

It is also an object of this invention to provide a lubricant composition having high tenacity to the lubricating surface and a high lubricating quality.

It is a further object to provide a lubricant composition which acts as an especially effective rust proofing and corrosive proofing material for the surfaces to which it is applied.

It is a particular object of this invention to provide a lubricant composition which is particularly adapted for the lubrication of the center plate of railroad units, the valve motion parts of locomotives, the side rods and wedges of locomotives, brakes embodying metal to metal braking surfaces, exposed gearing, and contact surfaces which are exposed to lubricant-removing fluids and gases, and which when so used will tenaciously adhere to the contact surfaces and provide efficient lubrication.

These and other objects will be apparent from the following description.

The lubricant composition contemplated by this invention is composed of an ordinary lubricant with which has been combined a desirable quantity of blue lead. The lubricant used may be any heavy oil or grease, it being desirable that the lubricant be heavy enough or of sufficient viscosity to prevent the blue lead from settling out.

As is well known, blue lead is a composition composed of the following substances in approximately the percentages listed.

*Sublimed blue lead*

| | Per cent |
|---|---|
| $PbSO_4$ | 49.8 |
| $PbO$ | 37.7 |
| $PbS$ | 6.1 |
| $PbSO_3$ | 2.8 |
| $ZnO$ | 1.0 |
| Undetermined | 2.6 |

Lubricant and blue lead are combined so that the blue lead makes up from 10 to 20 per cent by weight of the whole. It has been found that a lubricant composition containing from 10 to 20 per cent by weight of blue lead has the desirable lubricating qualities and in addition has a very high tenacity for the bearing surfaces upon which it is used. If less than 10 per cent of blue lead is used the tenacity quality of the composition is materially reduced, while if over 20 per cent of blue lead is used the composition does not possess the required lubricating quality and tends to be excessively abrasive. It is possible however that slightly less than 10 per cent or slightly more than 20 per cent of the blue lead might form a desirable lubricant composition.

Preferably this invention contemplates a lubricant composition comprising any ordinary relatively viscous lubricant and approximately 15 per cent by weight of blue lead.

The lubricant composition may be prepared by grinding or by milling the blue lead in a quantity of oil and subsequently mixing it with the lubricant vehicle such as heavy oil or grease. If desired the whole mass of the lubricant and blue lead may be ground or milled together, however this latter method is less practical as it involves the handling of a greater bulk of material during the operation.

The lubricant composition outlined above has the desired tenacity for bearing surfaces or contact surfaces and is suitable for use as above pointed out. The composition is also adaptable as a corrosive proofing and rust proofing material and in addition resists washing away by deleterious liquids.

While blue lead is the preferred substance to be combined with the lubricant vehicle to make up the lubricant composition, it is also possible to produce a lubricant composition which will have great tenacity as a lubricant composition comprising a lubricant and blue lead by utilizing a mixture of $PbSO_4$, PbO, and PbS in the approximate proportions these substances occur in blue lead as above set forth. The mixture of $PbSO_4$, PbO, and PbS may be added to a lubricant vehicle, such as a heavy oil or grease, in sufficient quantity to make up from 10 to 20 per cent by weight of the whole.

I claim as my invention:

1. A lubricant composition comprising a lubricant and blue lead, the blue lead making up from 10 to 20 per cent by weight of the whole.

2. A lubricant composition comprising a lubricant and blue lead, the blue lead making up approximately 10 per cent by weight of the whole.

3. A lubricant composition comprising a lubricant and blue lead, the blue lead making up approximately 20 per cent by weight of the whole.

4. A lubricant composition comprising a lubricant and blue lead, the blue lead making up approximately 15 per cent by weight of the whole.

5. A lubricant composition comprising a lubricant and a mixture of $PbSO_4$, PbO, and PbS in the approximate proportions they occur in sublimed blue lead, said mixture of $PbSO_4$, PbO, and PbS making up from 10 to 20 per cent by weight of the whole.

GEORGE S. CAVANAUGH.